United States Patent [19]

Hart

[11] 4,087,971

[45] May 9, 1978

[54] DEVICES AND METHODS FOR CONVERTING HEAT ENERGY TO MECHANICAL ENERGY

[75] Inventor: William Barrie Hart, Ipswich, England

[73] Assignee: Delta Materials Research Limited, Ipswich, England

[21] Appl. No.: 669,966

[22] Filed: Mar. 24, 1976

[30] Foreign Application Priority Data

Mar. 24, 1975 United Kingdom ............ 12195/75

[51] Int. Cl.$^2$ .................................................... F03G 7/06
[52] U.S. Cl. ............................................................ 60/527
[58] Field of Search .................... 60/527, 528, 529; 75/157.5, 162; 148/2, 32

[56] References Cited

U.S. PATENT DOCUMENTS

| 2,955,886 | 10/1960 | Fritzlen | 75/162 X |
|---|---|---|---|
| 3,403,238 | 9/1966 | Buehler | 60/527 X |
| 3,703,367 | 11/1972 | Cocks | 75/162 X |
| 3,773,504 | 11/1973 | Niimi | 75/157.5 |
| 3,832,243 | 8/1974 | Donkersloot | 75/157.5 |
| 3,913,326 | 10/1975 | Banks | 60/527 |
| 3,937,019 | 2/1976 | Renner | 60/527 |
| 4,019,925 | 4/1977 | Nenno | 148/32 |

*Primary Examiner*—Allen M. Ostrager
*Attorney, Agent, or Firm*—Wigman & Cohen

[57] ABSTRACT

There are disclosed devices and methods for converting heat energy into mechanical energy utilizing elements formed of materials which exhibit so-called shape memory effect (SME) characteristics, which elements are subjected to stress, strain and temperature conditions in a cyclic manner, the stress and strain conditions in the element being related by a closed loop locus plotted on the stress/strain/temperature spectrum. The elements may also be formed of bi-metallic expansion alloys or of other materials having a high thermal expansion coefficient. In one particular application of the invention as a heat engine there is provided a first member composed of elements made of a material exhibiting SME characteristics or of elements made of a bi-metallic material or of other materials having a high thermal expansion coefficient, and a second member which comprises means for deforming the first member, the arrangement being such that when the first member is subjected to a thermal cycling effect to establish a temperature difference between different parts of the first member the strains set up in the first member thereby are translated into a physical motion of the first member. The device is so arranged that the configurations of the component parts of the first member change in dependence on the temperature thereof and these changes in configuration generate forces effective to cause a relative movement of the first member with the respective second member. The thermal cycling effect may be obtained by arranging that over one part of the cycle each part of the first member has heat energy supplied thereto as, for example, by solar-, gas- or electric-heating or by exposing it to a hot fluid and over another part of the cycle each part of the first member is cooled as, for example, by exposing it to a cold fluid. Devices according to this invention have many diverse applications including as a prime mover powered, for example, by solar energy for irrigation and water pumping applications in arid and undeveloped areas of the world.

22 Claims, 48 Drawing Figures

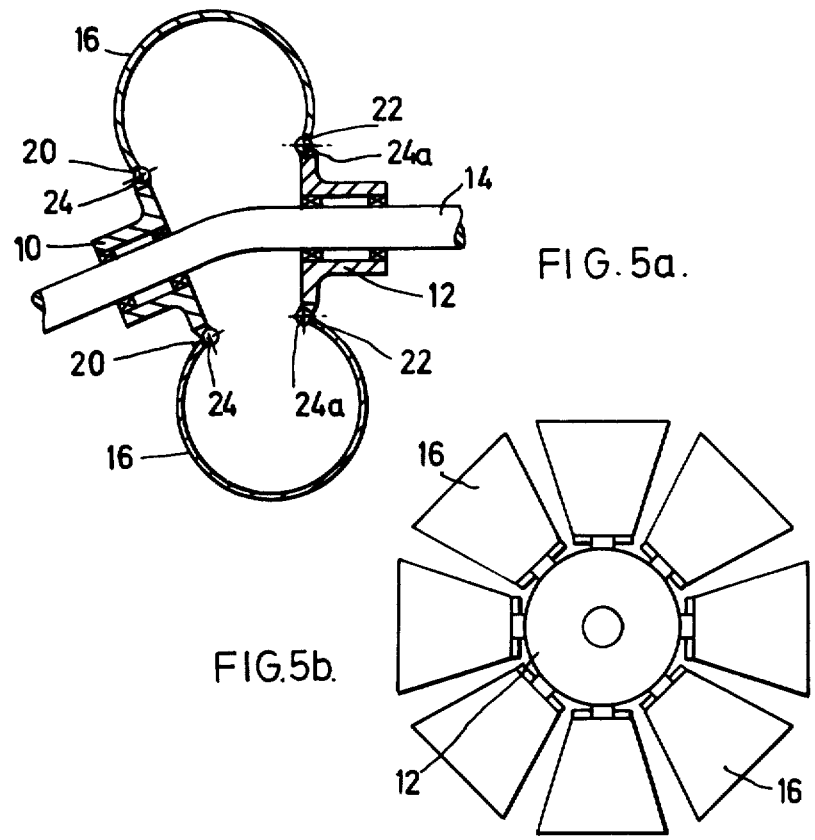
FIG.5a.
FIG.5b.
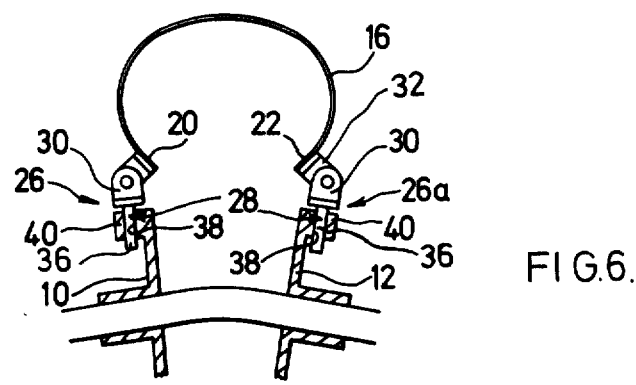
FIG.6.

DEVICES AND METHODS FOR CONVERTING HEAT ENERGY TO MECHANICAL ENERGY

This invention relates to devices and methods for converting heat energy into mechanical energy utilising strains developed in certain types of solid matter when heated or subjected to a temperature difference.

The invention has as one object simple, efficient and inexpensive energy conversion devices which are highly economical in operation, reversible and which are capable of operating from a variety of different energy sources including solar energy.

The invention proposes to apply the so-called Shape Memory Effect (hereinafter referred to simply as SME) characteristics observed in some metallic alloys to the production of a continuous mechanical work output from a continuous heat input. The invention also envisages the alternative use of bi-metallic expansion alloys in similar applications in lieu of the SME alloys or of any other material having a high thermal expansion coefficient.

In accordance with one aspect of the invention there is provided a method for converting heat energy into mechanical energy which comprises subjecting an element, formed of a material exhibiting SME characteristics or of a bi-metallic alloy or of a material having a high thermal expansion coefficient, to stress, strain and temperature conditions that vary in a cyclic manner the resulting changes in the configuration of the element caused by the strains set up therein being translated into a physical motion of the element.

In accordance with another aspect of the invention a device for converting heat energy into mechanical energy comprises a first member having at least parts thereof fabricated from a material exhibiting the so-called SME characteristics or of bi-metallic materials or of a material having a high thermal expansion coefficient, said first member mounted for movement relative to a second member, and means for subjecting said first member to a thermal cycling effect whereby said parts undergo a cyclic heating and cooling, the strain energy developed in said material as a result of said cyclic heating and cooling resulting in the generation of forces effective to move the first member relative to the second member.

Devices according to the present invention will, it is envisaged, have a particular application as a heat engine, in which a first member is composed of elements made of a material exhibiting SME characteristics or of elements made of a bi-metallic material, and the second member which comprises means for deforming said first member whereby when the first member is subjected to a thermal cycling effect to establish a temperature difference between different parts of the first member the strains set up in the first member thereby are translated into a physical, e.g. rotary, oscillatory or reciprocating, motion of the first member. The arrangement of the device is such that the configurations of the component parts of the first member change in dependence on the temperature thereof and these changes in configuration generate forces effective to cause a relative movement of the first member with respect to the second member.

The thermal cycling effect may be obtained by arranging that over one part of the cycle each part of the first member has heat energy supplied thereto as, for example, by solar-, gas-, or electric-heating or by exposing it to a hot fluid and over another part of the cycle each part of the first member is cooled as, for example, by exposing it to a cold fluid.

The Shape Memory Effect (SME) is a relationship between the stress ($\tau$), strain ($\epsilon$), and temperature ($T$) in the material that can be expressed in the general form:

$$\tau = f_1(\epsilon, T) \tag{1}$$

This relationship defines a three dimensional surface which can be represented graphically as a spectrum in two dimension as sketched in FIG. 1.

SME heat engines are devices that convert heat energy into mechanical energy. In doing so the SME element is subjected to stress, strain and temperature conditions that vary in a cyclic manner. It is fundamental to this concept of SME engines that the stress and strain conditions in the element are related by a closed loop locus plotted on the stress/strain/temperature spectrum.

The scope for variation in the design of SME engines as contemplated by the present invention can be seen by considering the number of possible methods by which a closed loop locus can be generated on the SME stress/strain/temperature spectrum. A locus in the spectrum can be produced by a functional relationship between either stress ($\tau$) and temperature ($T$), or strain ($\epsilon$) and temperature ($T$). There are two possible categories of SME engine therefore, each with many practical manifestations. Hereinafter these two categories will be distinguished by terming them stress based and strain based SME engines respectively.

The SME engines of the types with which the present invention is concerned are governed by the basic relationships $$\epsilon = f_2(T) \tag{2}$$

(i.e. strain based SME engines) and $$\tau = f_3(T) \tag{3}$$

(i.e. stress based SME engines)

In practice, the relationship of Equation (2) will be achieved by means of an SME element deformation system which will be so designed that displacement of the output shaft relative to some fixed origin produces a strain in the SME element.

As will be described hereinafter this strain can be produced by means of a cam, eccentric or crankshaft and connecting rod mechanism. Whichever is used the basic objective is to produce a cyclic relationship between the strain ($\epsilon$) and the angular position of the output shaft ($\theta$), thus:

$$\epsilon = f_4(\theta) \tag{4}$$

To complete this category of SME engine it is necessary to combine the Displacement System defined by Equation (4), with a Thermal System that relates the temperature in the SME element to the angular position of the output shaft, thus:

$$T = f_5(\theta) \tag{5}$$

As will also be described hereinafter there are many practical manifestations of this mathematical definition of a Thermal System.

Combining Equation (4) and (5) and eliminating ($\theta$) we achieve the basic requirement of the strain based SME Engine, that the strain and temperature are directly related. The second category of SME engines requires that the stress in the SME element is related to the angular position of the output shaft. The requirement is of course provided by the displacement systems of the strain based deformation type, and as such they are one possible solution to this category of engines. The other important solutions are however provided by linking the output shaft to the element by means of a spring, hydraulic link, or other connection in such a way that the stress in the element is related directly to the angle of the output shaft: thus $$\tau = f_6(\theta) \tag{6}$$

We will show later that there are many practical manifestations of this mathematical definition of a Deformation System.

To complete this type of engine it is also necessary to provide a Thermal System that relates the temperature in the element to the angular position of the output shaft, in a similar way to that defined for the former category:

$$\tau = f_7(\theta) \tag{7}$$

Combining Equations (6) and (7) and eliminating ($\theta$) we achieve the basic requirement of the stress based SME engine, that the stress and temperature are directly related.

In one example of the strain based type of deformation system the first member comprises a pair of hub members mounted on a common bent shaft with elements, e.g. strips, leaves or foils of material having SME characteristics, joined at opposite ends to different ones of said hub members to form loops of material extending between said hub members whereby the loops, upon rotation of the first member when subjected to a thermal cycling effect, tend to change their shape and this exerts a moment on the bent shaft causing rotation of the first member which rotation by virtue of the bent shaft produces a further cyclic contraction and expansion, the mechanical and thermal distortion of the first member thus induced combining to cause continued rotation of the first member.

At least one end and preferably both ends of each of the elements are connected to said hub members in a manner permitting the joints to rotate about two axes normal to one another thereby enabling sufficiently large forces to be generated by the distortion of the elements to rotate the first member effectively.

The elements of material exhibiting SME characteristics may be replaced with elements e.g. strips, leaves or foils of bi-metallic alloys or other materials having a high coefficient of thermal expansion which when subjected to heating and cooling at appropriate points in the cycle produce a torque effective to rotate the first member.

The invention also contemplates the provision of a device constructed with a cage formed of a plurality of tubes extending in parallel around and spaced from the axis of the cage, and secured rigidly at one end to an end plate or ring and rotatably mounted at the other end by means of bearings in another end plate or ring. The cage so formed is mounted for rotation relative to a second element or cam whose axis is parallel to but eccentrically mounted relative to the axis of the cage.

The tubes are connected at their free end to this eccentrically mounted second element by means of cam followers, or levers, so that rotation of the cage relative to the second element introduces torsion in each tube that progressively increases to a maximum value and then decreases to its initial value for each complete cycle of rotation of the cage. With this arrangement, upon subjecting the tubes to thermal cycling so that they are heated over that part of the cage cycle where the torsion has reached a maximum value and is decreasing to its minimum value, and cooled over the remainder of the cage cycle the heat energy flow is converted to mechanical energy thereby maintaining the relative rotation of the cage and enabling external mechanical work to be extracted from the assembly by a suitable transmission device.

In another aspect of the invention the rotor is formed as a cage with the longitudinally extending elements thereof consisting of strips of material exhibiting SME characteristics in lieu of the torsion tubes in the previously described embodiment.

In other forms of the invention utilising tubular SME elements the torsional strains are applied thereto by means of an eccentric and connecting link mechanism, or the SME elements may be arranged in spoke-like configuration around an axis and subjected to torsional strain by any suitable means such, for example, as a swash plate mechanism.

It is also contemplated that solid or hollow SME elements of circular or other cross-section may be utilised with the elements being subjected to approximately equal tensile and compressive stresses and either fixed or rotating SME element modes may be used in conjunction with any one of a variety of thermal systems.

Examples of stress based deformation systems will now be described. In one such system a series of elements made of a material exhibiting SME characteristics are each connected at one end to one end face of a hub member rotatably mounted on a shaft and extend from said end face in spaced parallel relationship longitudinally of the hub member. At their free ends which project beyond the other end face of the hub member each element is provided with a weighted member and is resiliently connected to said other end face. In this embodiment the elements are subjected to a thermal cycling effect whereby the elements undergo a cyclic expansion and contraction with resultant change of the centre of gravity of the device and rotation of the hub member about the shaft.

In another embodiment of a stress based system a coil spring is utilised to maintain the bent SME element in its maximum deflected position when in the cold state. As the temperature of the SME tube rises the tube tends to straighten and stretch the spring and by coupling to the element an additional load, for example, a single acting hydraulic pump that acts only during the extension or SME recovery phase work can be extracted from the system. In a variation of this system the bent tube is replaced by a torsion tube.

The simplicity of design, low number of working parts and flexibility insofar as heat energy input requirements are concerned, make the devices according to this invention extremely versatile and particularly suitable for use in undeveloped countries and other areas where the available energy sources are restricted and where economy of operation, simplicity of maintenance and infrequent servicing are features of prime importance. Thus, for example, the device according to this invention would, it is envisaged, by extremely useful as a prime mover powered, for example, by solar energy for irrigation and water pumping applications in arid and underdeveloped areas of the world.

From the foregoing it will be appreciated that a thermal system is required to be combined with any of the aforesaid strain based or stress based Deformation Systems in order to arrive at the total SME heat engine concept. The basic function of the Thermal System is to relate the temperature of the SME element(s) to the angular position of the engine output shaft in such a way as to produce a cyclic heating and cooling of the element(s) in proper phase relationship with the action of the Deformation System.

Examples of suitable Thermal Systems for this purpose include systems in which heating is effected: by alternately passing the SME element(s) through tanks containing hot and cold fluids respectively; or by spraying the SME element(s) alternately with hot and cold fluids; or by alternately immersing the SME element(s) in and spraying them with fluids of different temperatures; or by utilising a combination of a tank and a water wheel adapted to subject the SME element(s) alternately to the action of hot and cold fluids; or by means of a centrifugally induced flow of heating and cooling fluids along suitably arranged ducts to the SME element(s); or in the case of engines that use a horizontal axis, by causing the SME elements to pass through tanks of heating and cooling fluid at opposite ends of radially disposed SME elements, whereby rotation of the engine then produces alternate heating and cooling under the action of gravity.

Other features of the invention will be described hereinafter with reference to the accompanying drawings which show, by way of example, embodiments of the invention and in which:

FIG. 1(a) is a diagrammatic representation of a simple cantilever mechanism and FIGS. 1(b), (c) and (d) are diagrams of an idealised mechanical and thermal cycle for an SME heat engine according to the invention including a Deformation System partially fabricated from a material displaying the so-called SME characteristics;

FIGS. 2(a) and 2(b) are diagrams showing the recovery characteristics of a material displaying the so-called Shape Memory Effect;

FIG. 3 is a diagrammatic representation of a basic switching system for producing the thermal cycle using electric energy shown in conjunction with a heating SME cantilever mechanism but a bi-metal cantilever could also be used;

FIGS. 4(a) and 4(b) are schematic drawings in sectional side elevation and plan view, respectively, of a bent shaft deformation system according to the invention and based on the so-called SME characteristics of certain materials;

FIGS. 5(a) and 5(b) are schematic sectional elevation and plan views, respectively, showing an alternative embodiment of a bent shaft deformation system;

FIGS. 6 and 7 show details of the optional fittings at the root of the SME strips utilised in the device of FIGS. 4 and 5. Use of these fittings enables the maximum amount of strain energy to be extracted from the elements;

In the devices according to this invention utilising the so-called SME characteristics of certain materials the nature and characteristics of the metallurgical processes that are responsible for converting heat energy into a mechanical cycle are not completely understood and are still being investigated but an understanding thereof is not essential to an understanding of the present invention. Of course, the choice of the optimum SME characteristics will be important for the efficient working of devices such as motors and pumps based thereon but the present invention is primarily concerned with the arrangement of mechanisms in order to produce a cyclic mechanical output.

The fundamental system on which the devices according to this invention are based is illustrated more particularly in FIG. 1. The system is not limited to the simple idealised cycle illustrated in FIG. 1 but this serves to describe the nature of the thermal and mechanical energy cycles involved.

Referring to FIG. 1, the four phases of the cycle may be identified as follows:

(1)–(2) Increasing the stress on the SME element results in an increase in strain. The temperature is maintained consistent at some value ($A_1$).

(2)–(3) At some pre-determined strain value heat is fed in so that the alloy heat up to some temperature ($A_4$). At this temperature the state of strain energy in the element is high by virtue of the high stresses induced in the element by the shape memory effect.

(3)–(4) The stress in the element is now relieved by allowing the element to recover to its original state of strain defined by point (1). The temperature during this leg of the cycle can be maintained at the high value ($A_4$).

(4)–(1) The cycle is completed by removing the load and cooling the cantilever until the original state (1) is reached. At this point the cycle can commence again.

The cycle illustrated in FIG. 1 confirms that the anticlockwise characteristic of the system produces a work output "A" equal to the area contained by the cycle envelope the heat energy input required to produce this cycle being dependent on the temperature difference ($A_1$)–($A_4$).

Figure 1A:
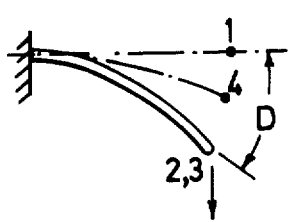
Figure 1C:
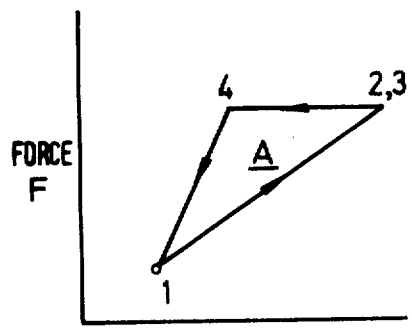
Figure 1C:
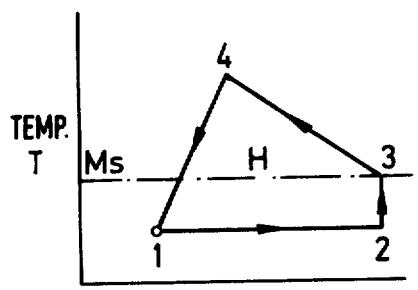
Figure 1D:
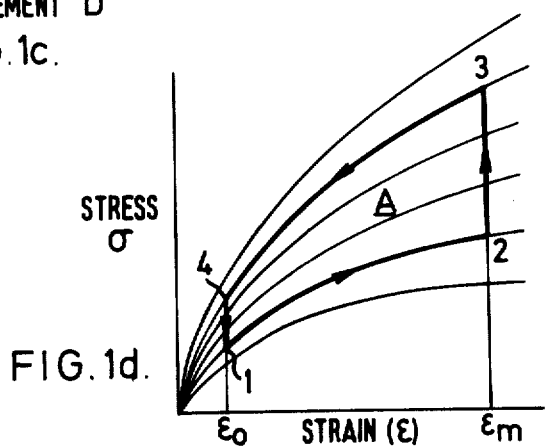
Figure 2A:
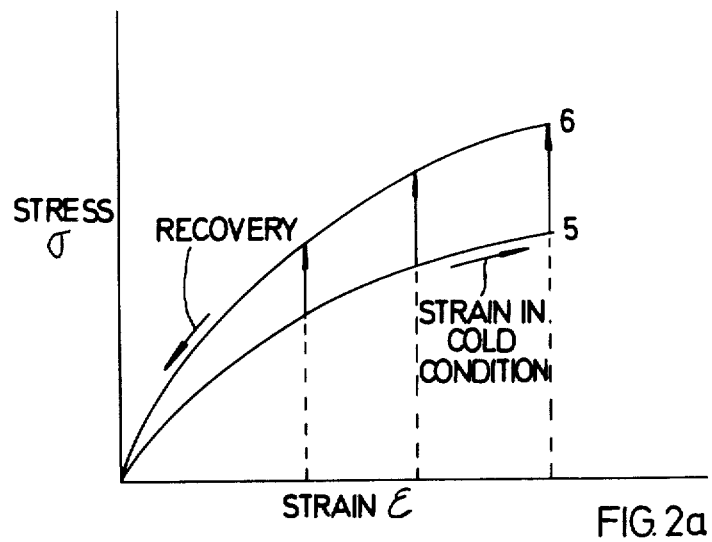
Figure 2B:
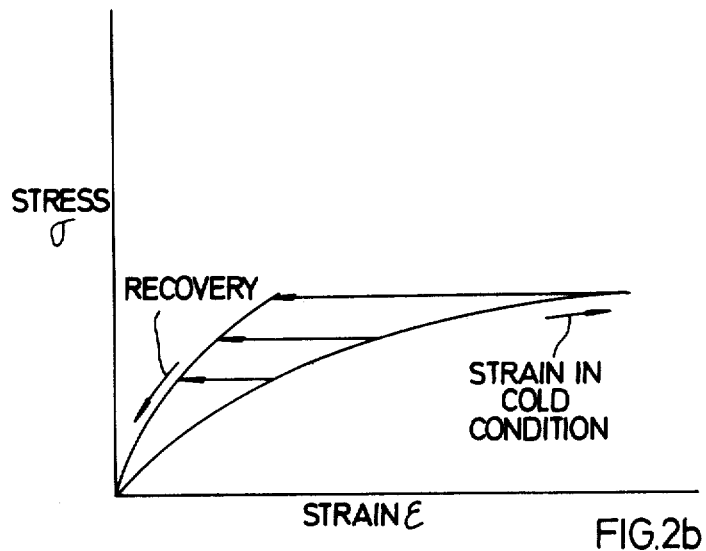

The recovery characteristics of the SME materials are shown in FIGS. 2a and 2b. FIG. 2a illustrates the constant strain characteristics, the strain being held constant between the points designated (5) and (6) while the shape memory takes place whilst FIG. 2b illustrates the constant stress characteristics with the stress held constant while the shape memory takes place.

The characteristics described above and illustrated in FIGS. 2a and 2b can be described as static characteristics, in that the material is allowed to transform at its own rate commensurate with the heating method. Time as a parameter does not affect the characteristics illustrated in FIGS. 2a and 2b. When the SME materials are used in the several motor arrangements described herein the mechanisms described subject the SME material to a programme of strain which is a function of time, dependent in turn on the frequency of cycling of the mechanism. The actual dynamic characteristics of the motor are therefore modified because of the additional dependence on time of heat transfer to the SME material from the heating and cooling media in the motor. In theory the dynamic characteristics of the SME material when performing in a motor are similar to the static characteristics illustrated in FIGS. 2a and 2b, with rounded corners to the envelope caused by heat transfer delays. The torque and power characteristics of the motor assembly can be computed from the static characteristics by consideration of the heat transfer equations, and geometric properties of the mechanism.

One of the simplest possible engines consists of a cantilever stress based deformation system combined with a direct heating electric Thermal System. The supply of heat in the proper phase relationship to the deformation of the element is controlled by a switching device illustrated in FIG. 3. As will be apparent therefrom, in the arrangement shown in FIG. 3 electrical energy is supplied to the cantilever when the spring contacts are closed. The load W is increased to a value sufficient to close the spring contacts causing electricity to flow through the SME material thereby heating it. When the temperature of the SME material reaches the transformation temperature the cantilever will commence to lift the load W and in so doing performs work on it. During the lifting process the spring contacts will break and the cantilever will commence to cool. The recovery process will cease when the temperature of the cantilever drops below the transformation temperature and the cantilever will again start to bend thereby lowering the weight W and eventually closing the spring contacts. This cycle of operations will continue for as long as electrical energy is supplied to heat the cantilever.

Figure 3:
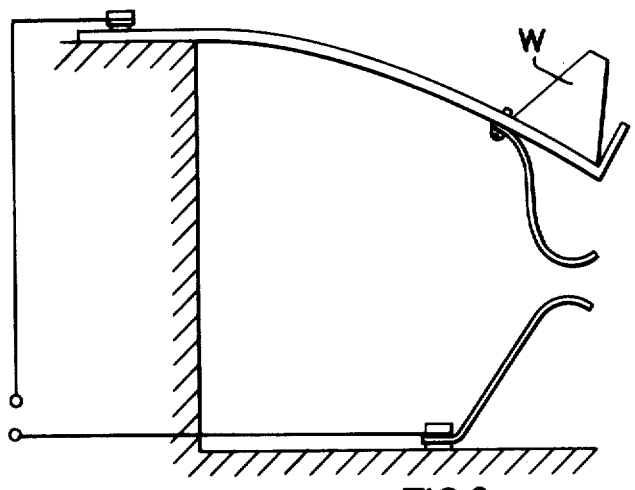

The cantilever motor described in the foregoing with respect to FIG. 3 is too basic for most practical requirements and the more sophisticated devices shown in FIGS. 4 to 9 constitute practical embodiments which enable a continuous rotary output to be produced by combining the SME cantilever characteristics with a bent shaft deformation system arrangement.

In the embodiment shown in FIG. 4 the essential feature of the motor is that the two hubs 10 and 12 are arranged on a common bent shaft 14. Strips of SME sheet material 16 are attached in loops to join corresponding points on the hubs. At least three such strips 16 are required in order to produce a self-starting motor and as a practical matter by increasing the number of such strips and hence the amount of "working" material the power output and efficiency of the motor are increased.

Rotation of the hubs 10 and 12 produces a cyclic contraction and expansion of the SME loops by virtue of the bent shaft effect. Combining this mechanical effect with a thermal cycling effect produces a rotary equivalent of the cantilever system previously described. The thermal cycling effect is achieved by applying heat to the loops formed by the strips of material over that part of the cycle where the loops are recovering from their maximum stress and cooling the loops over that part of the cycle where the loops are being wound up to their maximum stress.

The bi-metallic thermal expansion effect can also be used to produce a mechanical output with all the systems described in the foregoing. Bi-metallic strips substituted for the SME strips described in the foregoing will produce a torque when subjected to heating and cooling at appropriate phases of the cycle. The performance characteristics of the motor will, however, be different from those of a motor utilising the SME characteristics of certain alloys since the bi-metal expansion is a continuous phenomenon with heat input. The SME characteristic on the other hand is a non-continuous function of temperature, and the temperature level of operation is therefore critical. Bi-metallic materials are also expensive to manufacture requiring special rolling mills for fabrication. SME materials are made from one alloy only and are processed much more readily.

Suitable materials that can be used in the system according to this invention must be capable of converting heat into mechanical energy in the temperature range $-196°$ C to $+200°$ C. Such materials that possess this property are shape memory alloys, bimetals and high expansion alloys. Typical shape memory alloys are nickel titanium, Cu-Zn-X alloys where X can be Al, Sn, Si and Cu-Al-Y alloys where Y can be Fe, Mn, Ni. Examples of alloy compositions which operate in the above specified temperature range are:

| Composition | Nominal Transition Temperature |
|---|---|
| 63.75% copper<br>34.5% zinc<br>1.75% silicon | $-140°$ C |
| 55.4% nickel<br>44.6% titanium | $-40°$ C |
| 69.6% copper<br>26.2% zinc<br>4.2% aluminium | $2°$ C |
| 70.1% copper<br>25.9% zinc<br>4.0% aluminium | $42°$ C |
| 84.0% copper<br>13.3% aluminium<br>2.7% nickel | $82°$ C |
| 84.5% copper<br>11.15% aluminium<br>4.25% manganese | $160°$ C |

Most bimetals can be used in the systems according to the invention as their useful deflection range covers the specified temperature range. A typical bimetal consists of a high expansion alloy consisting of 25% Ni-8.5% Cr with the balance Fe coupled to a low expansion alloy of Fe containing 36% Ni. Many of the high expansion components used in bimetals can be applied in their own rights in the systems according to this invention and one example of such an alloy that could be used has a composition Mn-18% Cu-10% Ni.

Many different sources of thermal energy are possible for potential use in the Thermal System of the engines, amongst which may be noted the principal ones which are as follows:

1. Solar Heating

The motor can be so arranged that approximately one-half of the SME foils or strips are exposed to solar radiation whilst the remaining foils or strips are cooled either by shading from the radiation or by immersion in a coolant such as water. Solar intensifiers may also be used with benefit to improve the heat transfer rate, and hence the frequency of the motor, but the maximum temperature reached by the SME alloy must not be so high that the particular metallurgical property is destroyed. This temperature varies from alloy to alloy but would typically be a maximum of 500° C.

2. Gas Heating

Gas flame heating can be used to heat half of the foils or strips whilst immersion cooling is used for the remainder, but the maximum temperature reached by the SME alloy must not be so high that the particular metallurgical property is destroyed. This temperature varies from alloy to alloy but would typically be a maximum of 500° C.

3. Electric Heating

A commutator can be added to the hubs so that electrical energy can be fed to pre-determined segments whilst air or water is used to cool the remainder.

4. Hot and Cold Fluids

The motor could also be arranged so that half the foils or strips are exposed to a cold fluid whilst the remainder are exposed to a hot fluid.

Figure 7:
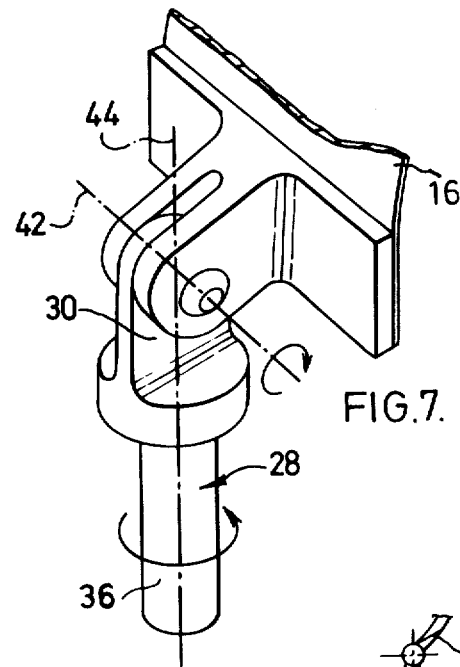

FIGS. 6 and 7 show a detail of a fitting at the root of the SME strips used in the deformation system of FIG. 5. As appears in FIG. 5, the hubs cannot slide along the shafts - only rotate about them, and the opposite ends 20, 22 of each of the strips 16 are secured by pivot joints 24, 24a to the hubs 10 and 12 respectively.

Figure 8:
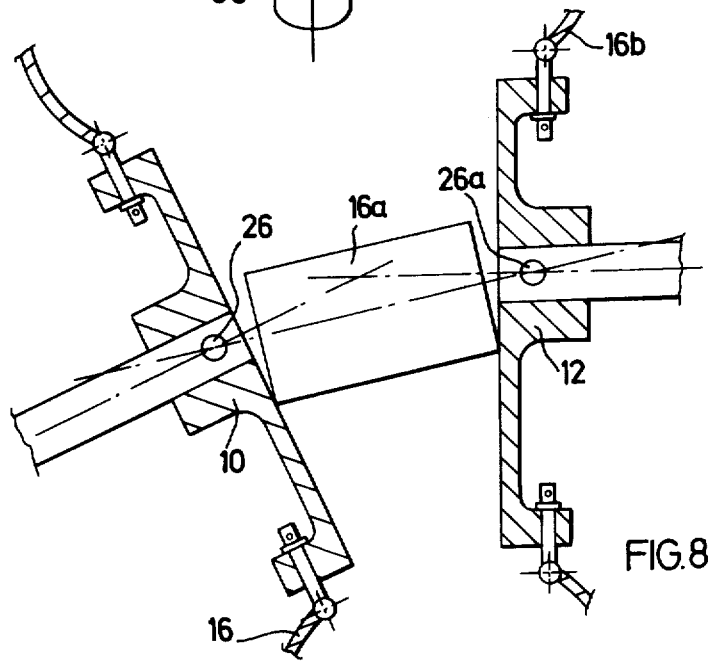
FIG. 8 is a schematic drawing showing the functional principles underlying the operation of the bent shaft rotor shown in FIGS. 4 to 7 inclusive.

In the alternatively root fitting shown in FIGS. 6 and 7, the opposite ends 20, 22 of each of the strips 16 are connected to the hubs 10 or 12 respectively, by pivots designated 26, 26a. The pivots 26, 26a each comprises a pin 28 the head portion 30 of which is pivotally connected to a bracket (32) at an end of the strip 16 by the pin (28), the shank portion 36 of pin 28 being rotatably received in a socket portion 38 of a bracket 40 secured to each of the hubs 10 and 12. With this arrangement the roots of the SME strips 16 are free to pivot about the two axes, 42 and 44 an it is thus ensured that the maximum amount of flexural strain energy stored in the strips 16 is released to produce a torque for rotating the rotor. In FIG. 8 there is shown, the SME strips 16, 16a and 16b in various positions during a cycle of operations. Thus strip 16b is shown in its fully recovered position from where further rotation starts to re-compress the strip at a temperature below the transition temperature. The forces acting on the pivot joints 26, 26a are shown in the force diagram at each pivot location. The strip 16a, which appears in plan view, is in the central position after partial recovery and strip 16 is in its fully compressed position from where SME recovery is about to commence.

Figure 9:
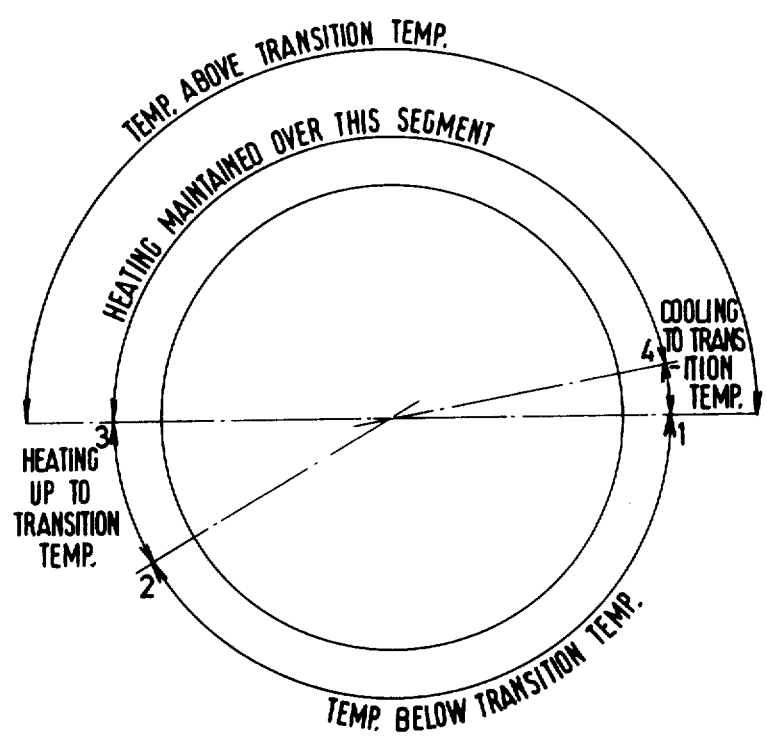
FIG. 9 is a diagrammatic representation of the heating and cooling phases effected during a cycle of operations of a device according to this invention.
Figure 9:
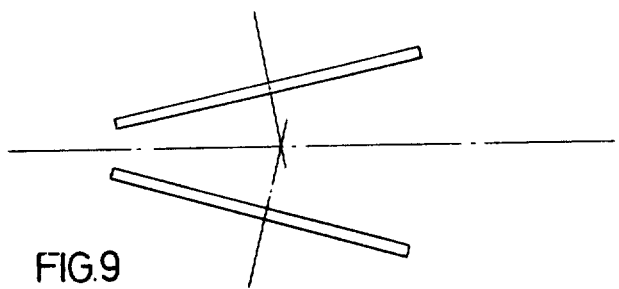

The thermal cycling effect to which the rotor is subjected is shown diagrammatically in FIG. 9 with the points designated (1), (2), (3) and (4) corresponding to the identically designated points in FIG. 1.

Figure 10:
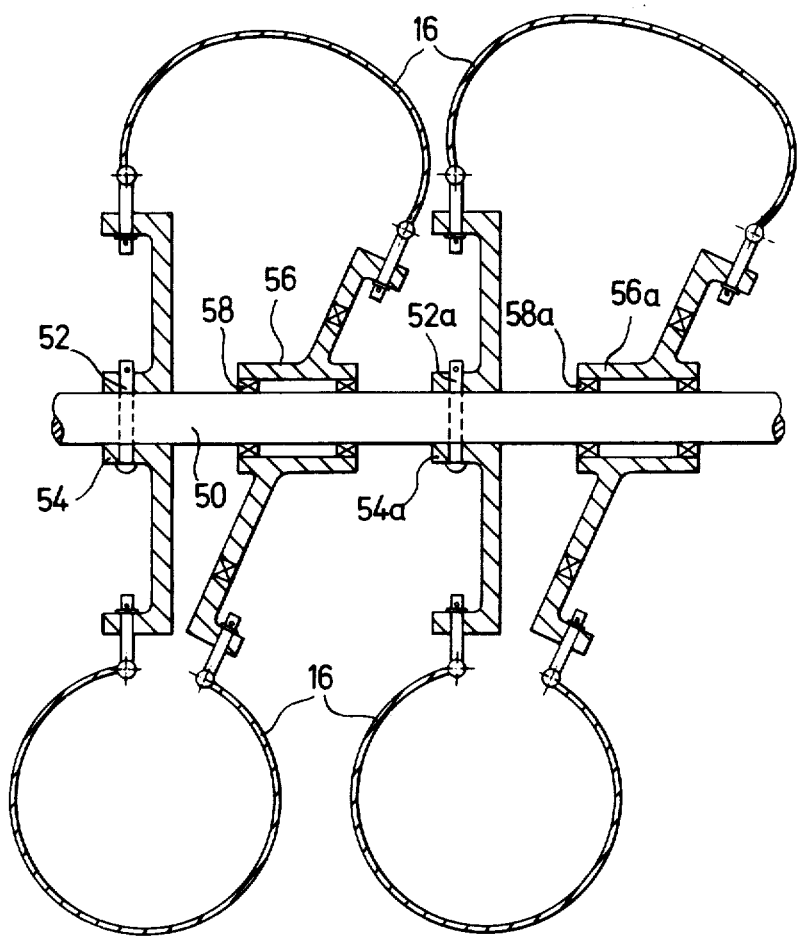
FIG. 10 is a schematic drawing of a multi-stage bent shaft deformation system according to the invention.

The multi-stage bent shaft deformation system shown in FIG. 10 consists of a pair of rotor elements of the type used in the deformation system shown in FIGS. 4 to 8 mounted on a common shaft 50, the pins 52, 52a securing the hubs 54, 54a to the shaft 50 and the hubs 56, 56a, being mounted on bearings 58, 58a.

Figure 11A:
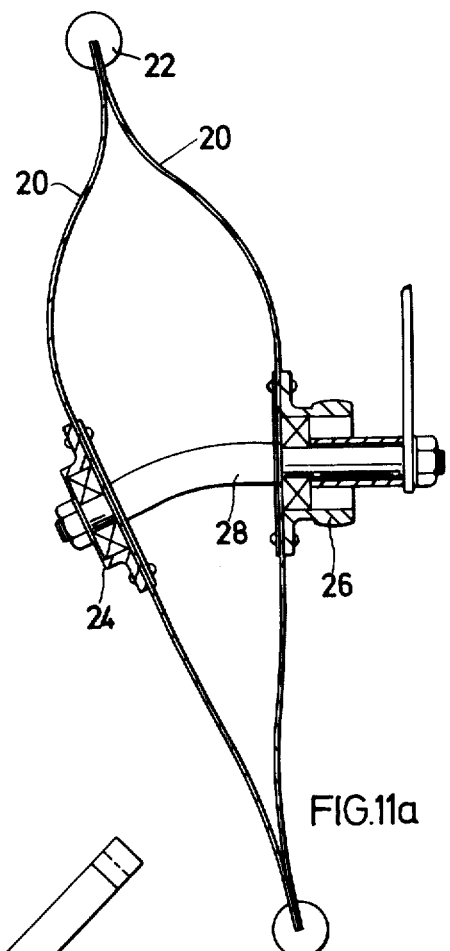
FIGS. 11a and 11b are schematic drawings in sectional side elevation and plan view, respectively, of a bent shaft deformation system according to the invention utilising rotor elements of either SME or bi-metallic materials.
Figure 11B:
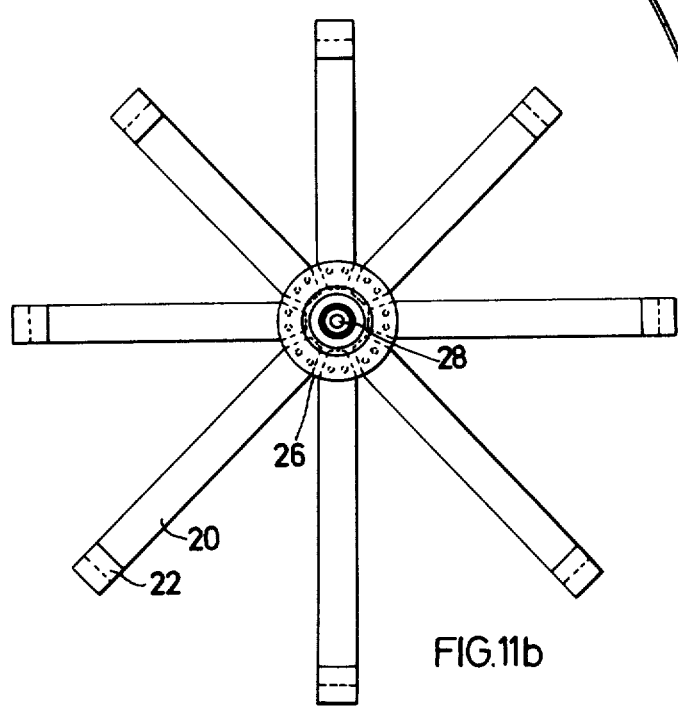
Figure 12:
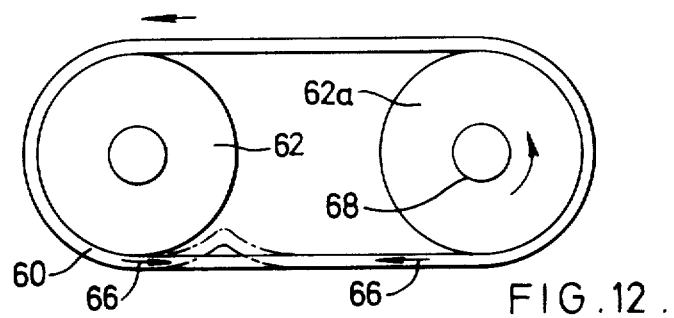
FIG. 12 is a schematic drawing of a belt deformation system on the so-called SME characteristics of certain materials.

FIG. 12 shows a schematic arrangement of a belt deformation system employing a continuous belt made of a material that exhibits SME characteristics. The belt 60, which extends around a pair of pulleys 62, 62a, may be made entirely of an SME alloy or may be a composite construction containing elements made of a material exhibiting SME characteristics. The belt 60 is so arranged that on applying heat to one part of the belt it effectively contracts to produce tension indicated by arrows 66, in the belt adjacent to the heat source causing a distortion of the belt as indicated by the dotted line portion. The whole assembly is caused to rotate by installing a ratchet 68 in one of the pulleys, pulley 64 as shown in FIG. 11, the ratchet allowing rotation in the direction of the arrow 70.

Figure 4A:
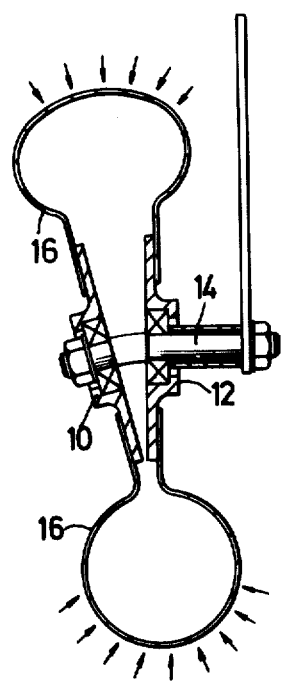
Figure 4B:
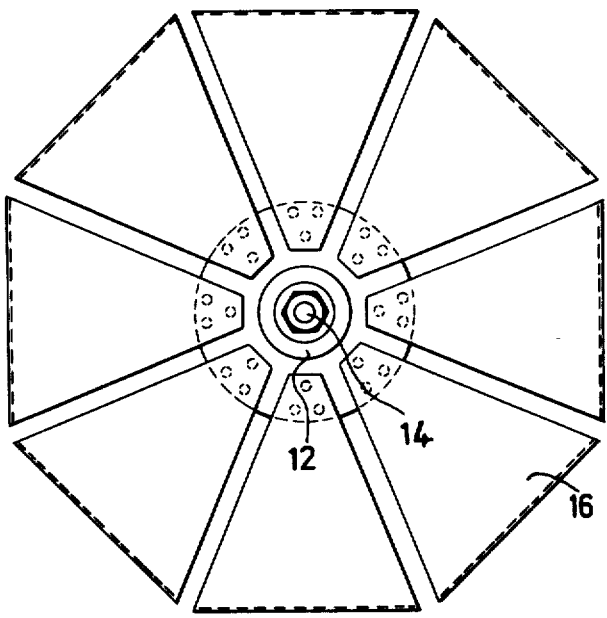

In FIG. 11 there is shown a variation on the bent shaft motor deformation system of FIGS. 4a and 4b in which the continuous strips of SME material are replaced by pairs of strips of SME material connected at their outer ends of clip members 22 and rigidly secured at their opposite ends to hub members 24 and 26 mounted on a common bent shaft 28. Both hubs are free to rotate about the shaft in the manner of swash plates.

Figure 13:
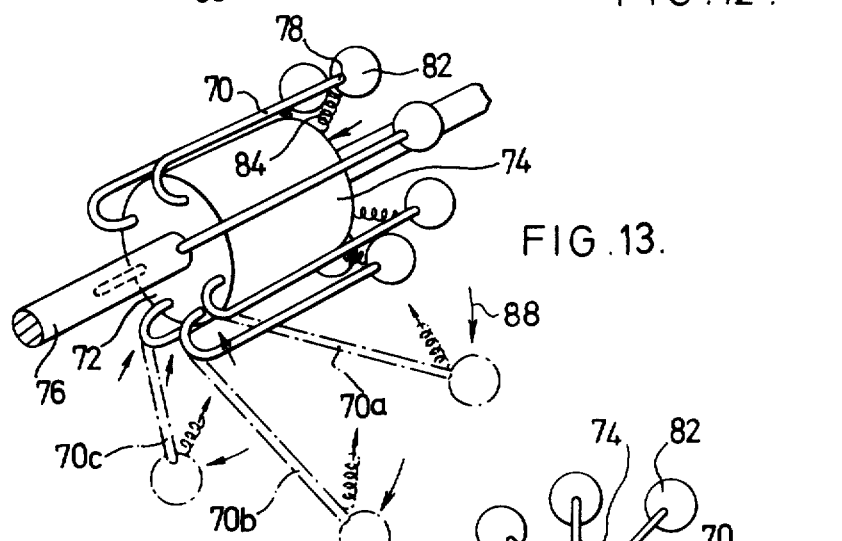
FIGS. 13, 14 and 15 are schematic drawings in perspective end view and side view, respectively, of variable centre of gravity type deformation systems according to the invention and based on the so-called SME characteristics of certain materials.
Figure 14:
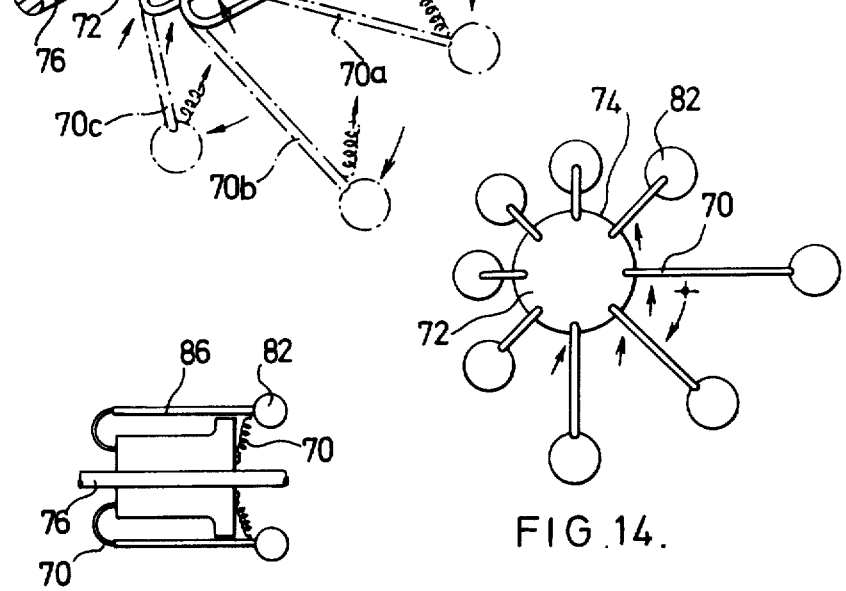
Figure 15:
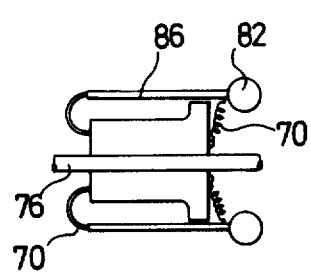

FIGS. 13, 14 and 15 show a variable centre of gravity type deformation system wherein the rotor assembly comprising a series of elements in the form of rods 70 are each connected at one end to one end face 72 of a cylindrical hub member 74 rotatably mounted on a shaft 76. The rods 70 are made of a material exhibiting SME characteristics and extend from end face 72 in spaced parallel relationship longitudinally of hub member 74, with their opposite free ends 78 projecting beyond the opposite end face 80 of hub member 74. At their free end 78 the rods 70 are provided with a weighted member 82 and are each connected to end face 80 by means of resilient members shown as springs 84. As shown in FIG. 15 the linear intermediate portion of each of the rods 70 may be enclosed in a stiffening tube 86 made of any suitable material. In operation and upon subjecting the rod assembly to a temperature differential by applying heat over one region of the periphery of the rod assembly as indicated by the arrows 88 the rods in that region e.g. the rods designated 70a, 70b, 70c and 70d in FIG. 14 change their position relative to the hub member 74 thereby changing the effective centre of gravity of the rotor assembly and hence causing rotation thereof. Cooling of the rotor assembly is effected over another region thereof opposite the heated region. The springs 84 resist the change in position of the arms 70 and ensure that they return to their rest position during the cooled phase of their cycle. The springs must be of sufficient rate to resist without excessive deflection the forces generated by the SME material and in addition the increased centrifugal forces acting on the weights that have been displaced from their rest position.

In the embodiments shown in FIGS. 16 and 17, FIGS. 18 and 19 and FIGS. 20 and 21, the rotor assembly comprises an assembly of tubes 90 each made of a material exhibiting SME characteristics. The tubes 90 are disposed in parallel relationship in a circular configuration about a shaft 92. Each of the tubes 90 is connected at one end to an end plate 94 mounted on bearings 96 for rotation about the shaft 92. The other ends of the tubes 90, extend through another end plate 98 mounted on bearings 100 for rotation about shaft 92 and are connected to cam follower arms 102 associated with a cam 104 mounted on shaft 92 for rotation therewith. The arrangement is such that upon establishing a temperature differential between different regions of the rotor assembly the tubes 90 in the elevated temperature region are subjected to an increased torsional stress as a consequence of their SME behaviour, thereby inducing a torque on the rotor assembly to initiate rotation thereof. Thereafter the tubes 90 via the cam 104 and associated cam follower arms 102 are subjected to mechanically induced torques and the combined mechanically and thermally induced torques on the rotor assembly cause continued rotation thereof.

Figure 16:
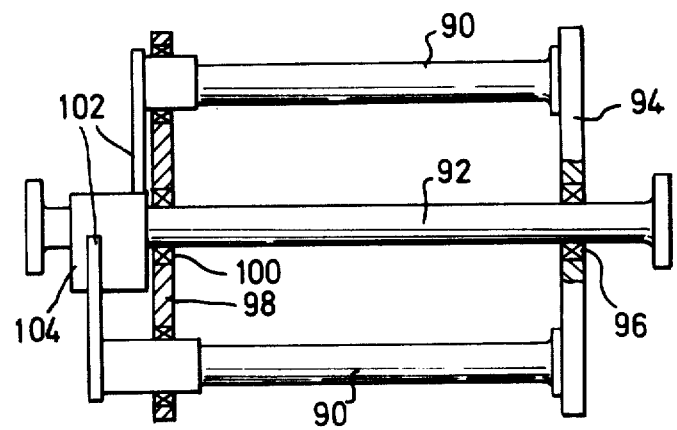
FIG. 16 is a schematic drawing in side elevation of a torsion tube deformation system according to the invention based on the so-called SME characteristics of certain materials.
Figure 17:
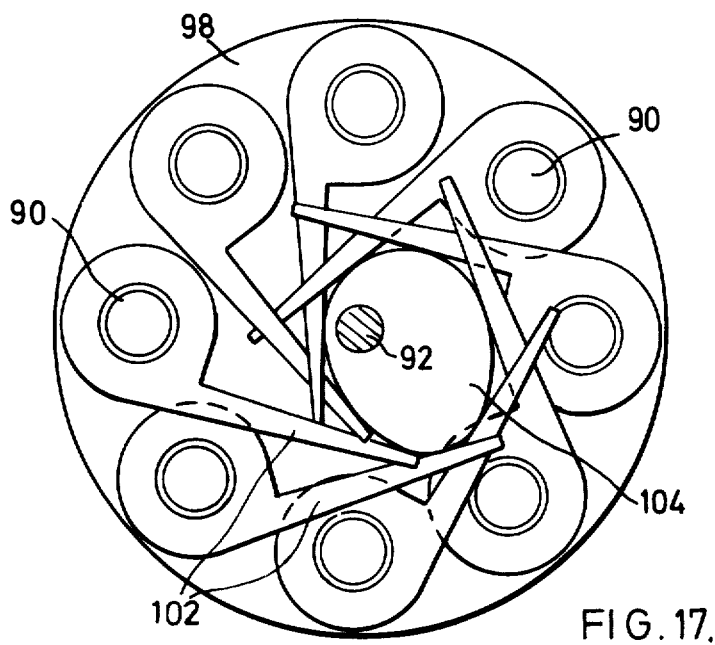
FIG. 17 is an end view of the deformation system shown in FIG. 16.
Figure 18:
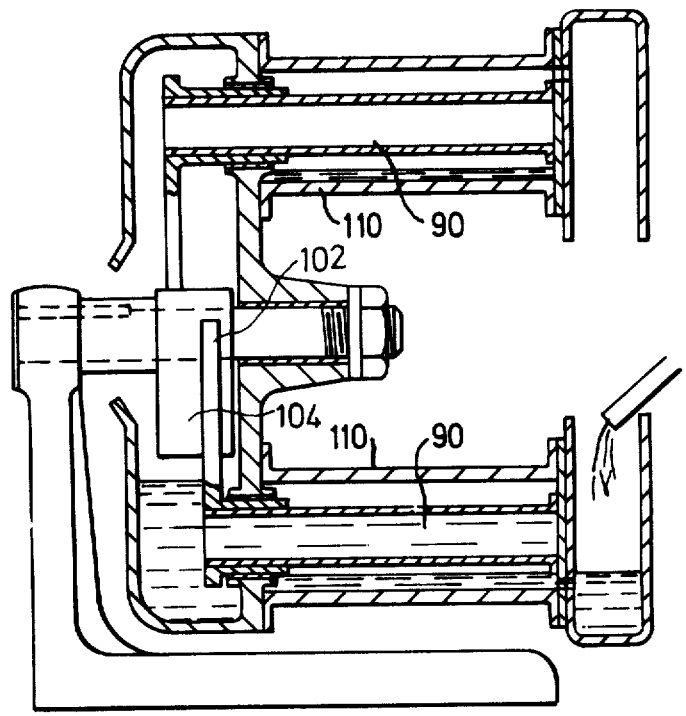
FIG. 18 is a view in side elevation of another embodiment of the torsion tube deformation system according to the invention showing details of a thermal system that combine particularly well with the type of deformation system.
Figure 19:
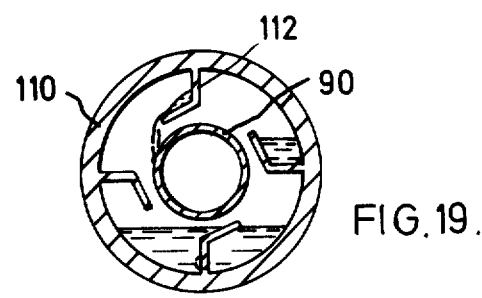
FIG. 19 shows a detail of an arrangement for use in the motor of FIG. 18 for transferring hot water to the torsion tubes over one part of the cycle only.

The general configuration and construction of the embodiments shown in FIGS. 18 to 21 is based on that of the embodiment of FIGS. 16 and 17. In the embodiment of FIGS. 18 and 19 however the SME tubes 90 are disposed within an outer heavy gauge tube 110, cold water for cooling purposes being circulated by the tubes 90 and hot water scooped up by baffles 112 depending from the inner wall of tubes 110 being caused to flow over the tubes 90 over the upper half of the cycle.

Figure 20:
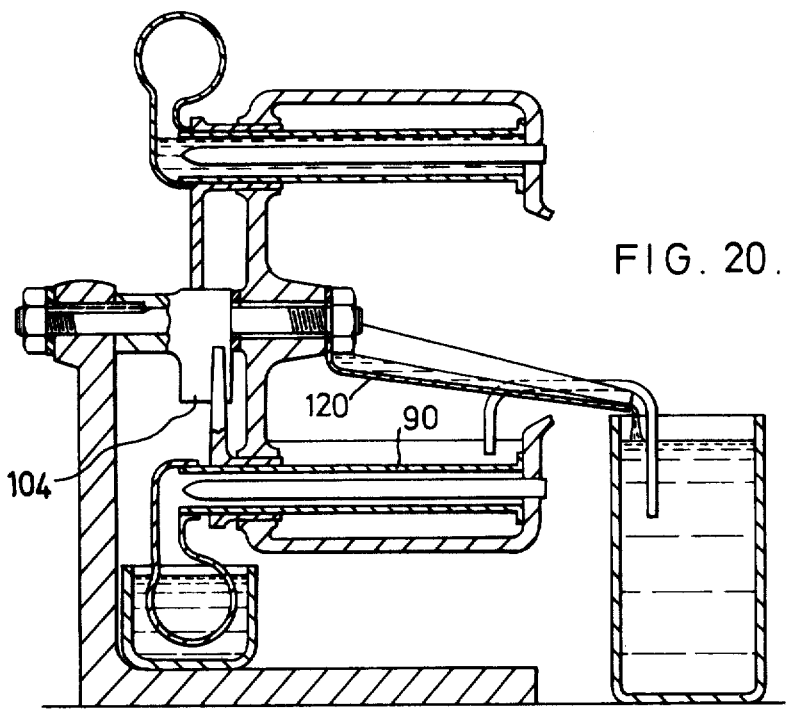
FIG. 20 is a view in side elevation of a further embodiment of a torsion tube deformation system according to the invention showing details of a further type of thermal system.
Figure 21:
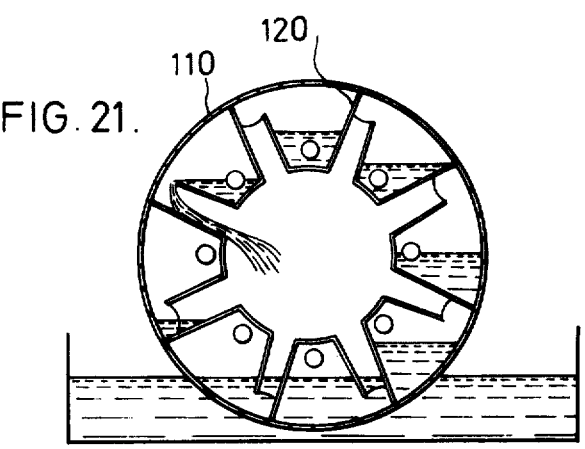
FIG. 21 shows a detail of an arrangement for use in the motor of FIG. 20 for transferring hot water to the torsion tubes over one part of the cycle only.

A more sophisticated water circulating system is shown in FIGS. 20 and 21 and involves a paddle blade arrangement 120 associated with the inner wall of the tubes 110 and effective to ensure a flow of cold water over the tubes 90 in the lower half of the cycle and a flow of hot water over the tubes 90 in the upper half of the cycle.

Figure 22:
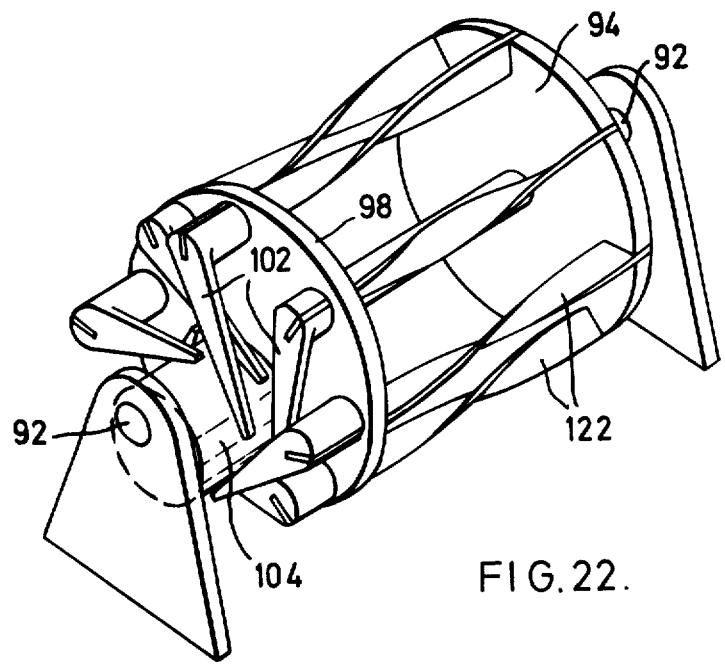
FIGS. 22 and 23 are views in perspective and end elevation, respectively, of a twisted strip deformation system according to the invention.
Figure 23:
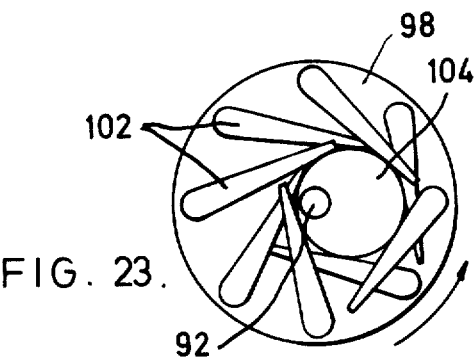

FIGS. 22 and 23 show a rotor assembly similar to that in the embodiment of FIGS. 16 and 17 in which strips of SME material 122 are employed in lieu of the tubes 90.

Figure 24:
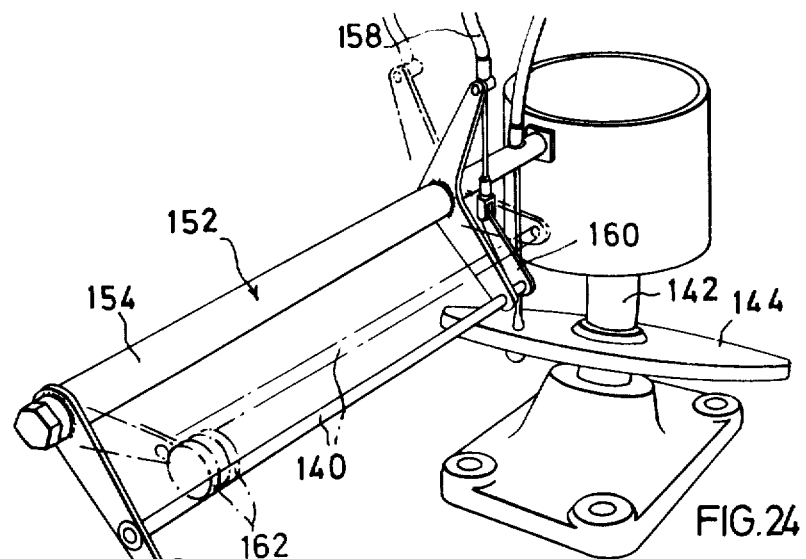
FIG. 24 is a perspective view of a part of an alternative embodiment of an SME torque tube deformation system.
Figure 25:
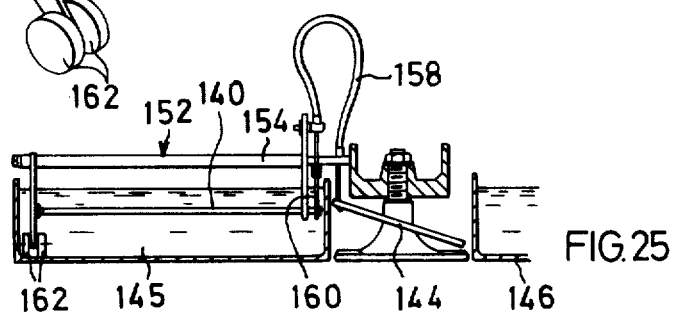
FIG. 25 is a side elevation of the motor shown in FIG. 24.
Figure 26:
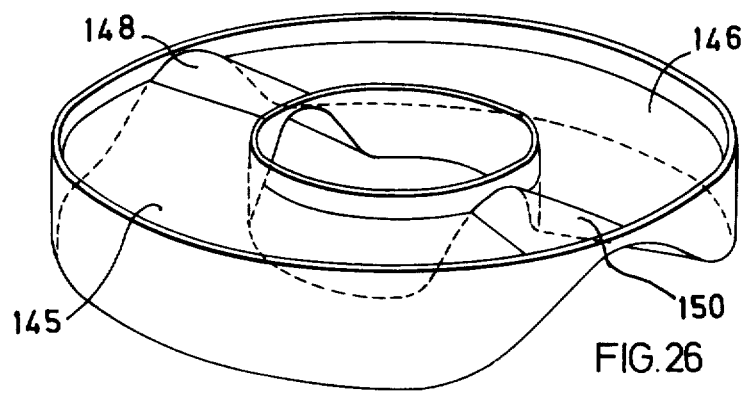
FIG. 26 is a perspective view of an alternative tank arrangement for use with a motor assembly as shown in FIGS. 24 and 25.

As an alternative to the 'Squirrel Cage' type of torsion tube motor described in the foregoing the present invention also contemplates an arrangement which employs radial torsion tubes 140 combined with a bent shaft 142 as shown in FIGS. 24 to 26 and swash plate 144. The particular arrangement shown in FIGS. 24 to 26 facilitates the use of heating and cooling liquids contained in tanks generally designated 145 and 146 mounted side by side in the horizontal plane and separated from each other by walls made in the form of ramps 148 and 150. In motion the SME torque tubes 140 are driven through the heating and cooling liquids and the transition from one tank to another is enabled by pivoting of the torsion tube carrier assemblies generally designated 152 about the axle member 154.

Torsion is applied mechanically to the SME torque tubes 140 by virtue of the action of a swash plate 144, Bowden cable 158, and lever assembly generally designated 160. Pivoting of a torque tube carrier assembly 152 can take place without affecting the torque in the SME tube since the Bowden cable 158 transmits the force in the SME lever assembly 160 direct to the swash plate 144 - leaving a zero resultant force on the torque tube assembly 152.

In the arrangement shown in FIGS. 24 to 26 pivoting action of the torque tube assembly is activated by the motion of the cam follower wheels 162 rolling up and down the ramps 148 and 150 separating the heating and cooling liquids.

Figure 27:
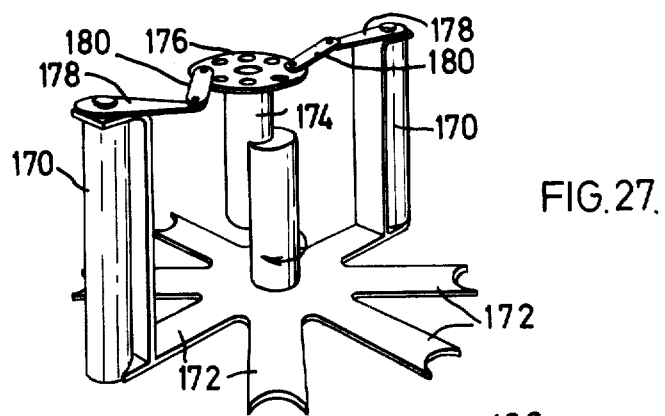
FIG. 27 is a diagrammatic representation of a torsion tube deformation mechanism with the tubes arranged parallel to the axis.

FIG. 27 illustrates a torsion tube mechanism in which the torsional strains are applied to the SME tube elements 170, which are disposed parallel to and mounted on arms 172 radiating from shaft 174, by means of an eccentric 176 and connecting link mechanism 178, 180, the amount of torsional strain applied being a function of the geometry of the system. This mechanism can be used with the elements 170 fixed in space and the shaft 174/ eccentric 176 rotating relative to them, or with the elements 170 rotating in space relative to a fixed shaft 174/ eccentric 176, the type of thermal system used being selected in accordance with the specific torsion tube mechanism employed.

Figure 28:
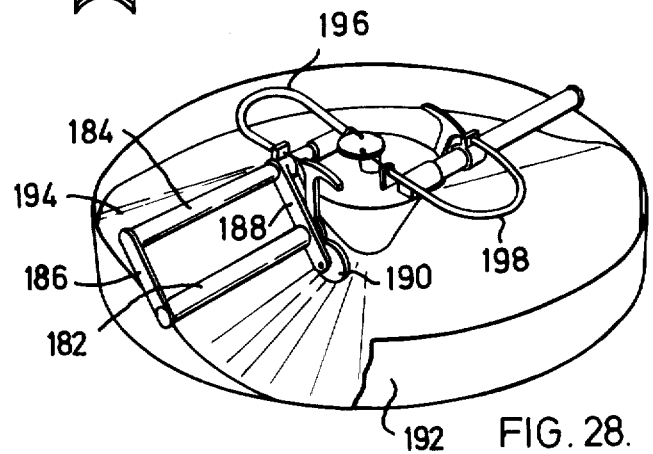
FIG. 28 shows a torsion tube deformation mechanism for use where the tubes are disposed normal to the axis.

In the torsion tube mechanism shown in FIG. 28 the SME tubes 182 are arranged in the manner of the spokes in a wheel i.e. with the tubes 182 normal to the axis. The tubes 182 may be twisted by any of a variety of possible systems including a swash plate mechanism. This type of mechanism can be used either with the SME elements fixed or rotating in space, depending on the type of thermal system used. It is a mechanism that can conveniently be used with the side-by-side hot and cold thermal systems to be described hereinafter. In order to do this however it is necessary to arrange that the SME tube elements can "hop" across the wall separating the tanks without any effect on the torsional strain in the tubes. In the mechanism shown in FIG. 28 the SME tube 182 is connected to a support arm 184 by links 186 and 188, the link 188 carrying a ramp follower 190 which cooperates with the base of the container 192. This mechanism which employs Bowden cables enables the SME tube element 182 to traverse the wall 194 which divides the tank 192 into separate compartments or tanks containing hot and cold fluids respectively.

Figure 29:
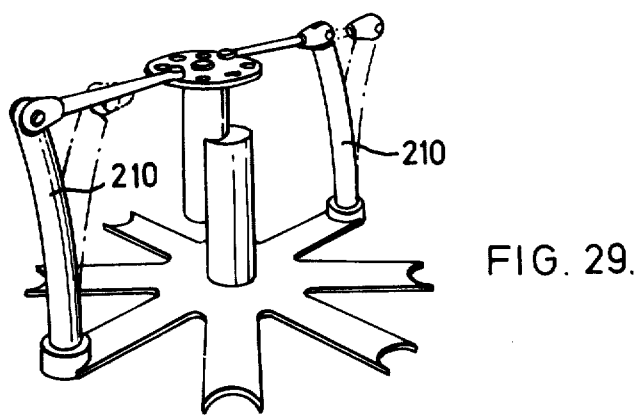
FIG. 29 is a diagrammatic representation of a bent tube deformation mechanism.

Solid or hollow SME elements of circular or other cross-sections can be deformed in bending by the type of mechanism shown in FIG. 29. In this embodiment each of the SME elements 210 when deformed is subjected to approximately equal tensile and compressive stresses that may vary along the length of the element, depending on its geometric design, and it will also carry shear stresses. This mechanism can be used in the fixed or rotating SME element modes with a variety of possible thermal systems and it has the advantage of very great simplicity.

Figure 30:
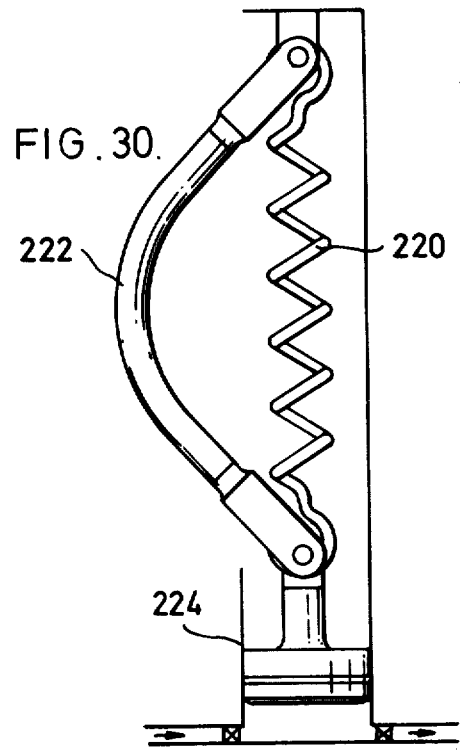
FIG. 30 is a diagrammatic representation of a stress based torsion tube deformation mechanism.

FIG. 30 shows a bent tube deformation system. In its simplest form, the mechanism consists of a coil spring 220 that maintains the best SME tube 222 in its maximum deflected position when in the cold state. As the temperature of the SME tube 222 rises the tube tends to straighten and stretch the spring 220. Work can be extracted from this system by connecting an additional load to the SME tube 222 that acts only during the extension or SME recovery phase. In practice this load could be a single acting hydraulic pump 204 as shown in FIG. 30.

Figure 31:
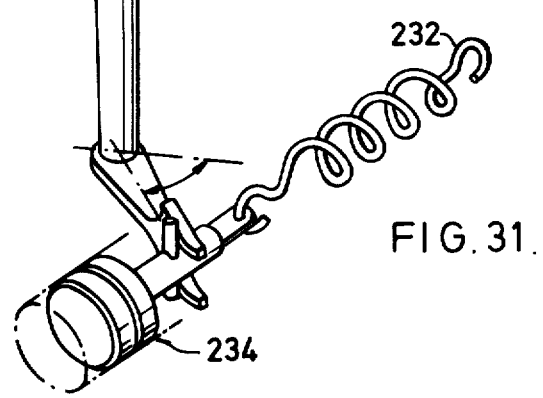
FIG. 31 is a diagrammatic representation of a stress based bent tube deformation system.

FIG. 31 shows a torsion tube mechanism which is very similar in principle to the mechanism shown in FIG. 30 including a spring 232 and pump 234 but in which the bent tube is replaced by an SME torsion tube 230 which provides advantages in lay out in certain applications.

It is noted that whereas in the strain based systems described previously an even number of elements and/or an inertia fly wheel is required to prevent stalling, the stress based deformation systems such as shown in FIGS. 30 and 31 cannot stall and any number of elements can be employed.

Figure 32:
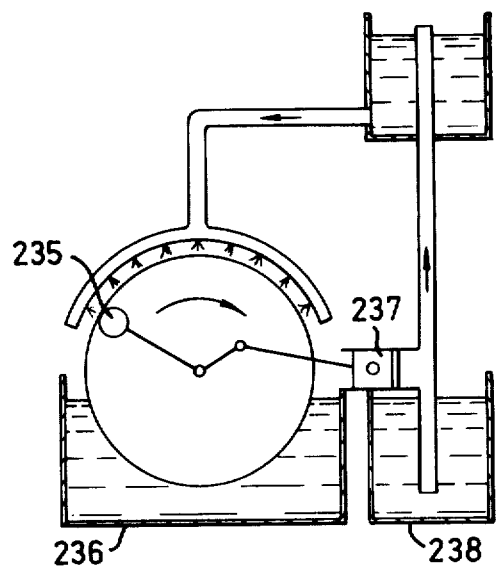
FIG. 32 is a diagrammatic representation of an open tank/spray thermal system.

FIG. 32 is a diagrammatic illustration of an open tank/spray thermal system in which the SME element designated 235 is alternatively immersed in hot fluid in tank 236 and sprayed with a cold fluid pumped from tank 238 by a pump 237.

Figure 33:
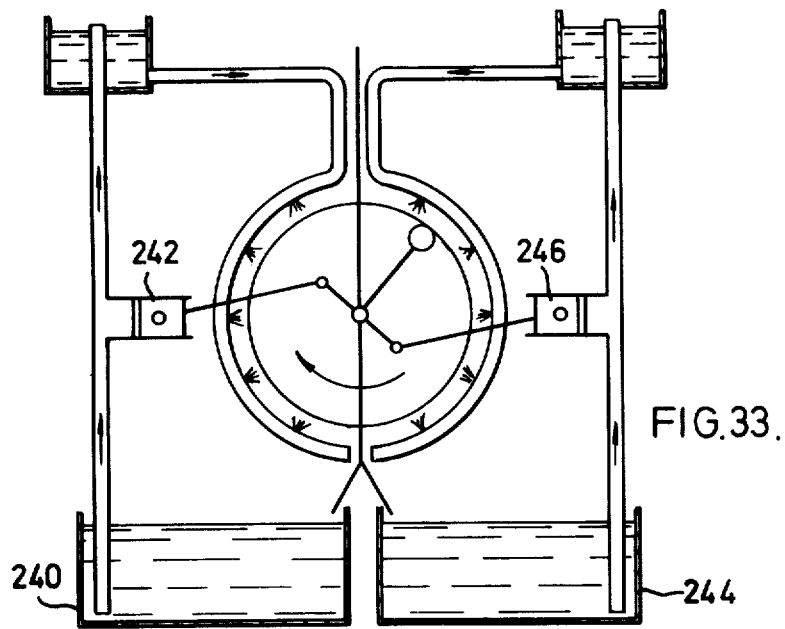
FIG. 33 is a diagrammatic representation of a spray/spray thermal system.

FIG. 33 is a diagrammatic illustration of a system in which sprayed fluids are used for both heating and cooling. In this arrangement hot fluid pumped from tank 240 by means of a pump 242 is sprayed over the SME during one part of the cycle and cold fluid from tank 244 is sprayed by means of a pump 246 over the SME element during the other part of the cycle.

Figure 34:
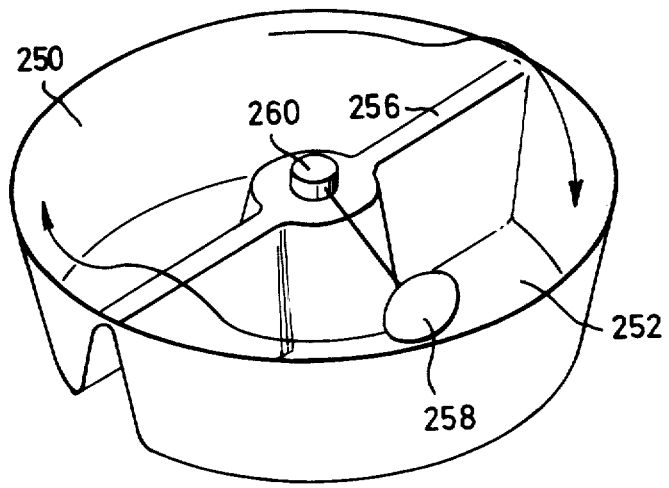
FIG. 34 is a diagrammatic representation of a horizontal open tank/horizontal open tank thermal system.
Figure 35:
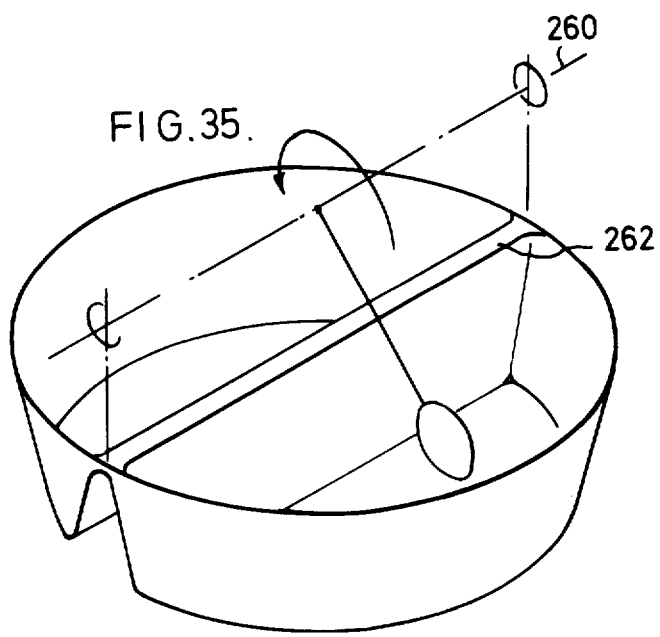
FIG. 35 is a diagrammatic representation of a horizontal open tank/horizontal open tank locking system.

FIG. 35 is a diagrammatic representation of a thermal system employing horizontally disposed tanks containing hot and cold fluids respectively and the SME element passes in alternation through the two tanks. In the arrangement shown in FIG. 34 the two tanks are constituted by two compartments 250 and 252 formed in a container 254 by means of a dividing wall 256, the SME element 258 being rotated about the axis 260 and alternately passing through the compartments 250 and 252 which contain cold and hot fluids respectively. With this arrangement it is necessary for the engine mechanism to have some facility for enabling the SME element(s) to hop over the dividing wall 256 in passing from one phase to the other and a mechanism for doing this such as has been described hereinabove with reference to FIG. 28 may be used. The complete immersion of the SME elements that is made possible by this system enables the heat transfer rate into and out of the SME element to be maximised although there are certain fluid dynamic loses caused by driving the SME elements through the period.

FIG. 35 shows a system similar to that in FIG. 34 but in this case the transition from the hot phase to the cold phase is obtained by rocking the SME element about a horizontal axis 260 at a height above the dividing wall 262 between the two phases and there is of course a dwell period during which the SME elements are in neither one phase nor the other.

Figure 36:
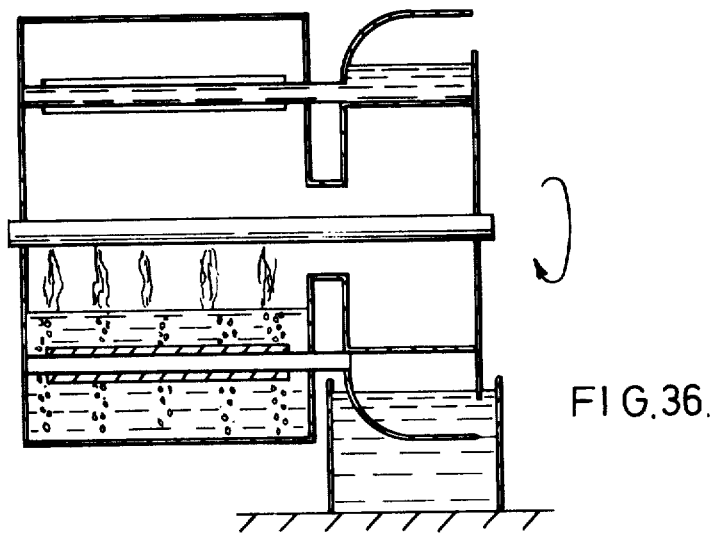
FIG. 36 is a diagrammatic representation of a horizontal tank/water wheel thermal system.

FIG. 36 shows a horizontal tank/water wheel system which is particularly suitable for use in conjunction with the squirrel cage type of torsion tube engine described hereinbefore and it enables positive separation of the heating and cooling media to be achieved at all times.

Figure 37:
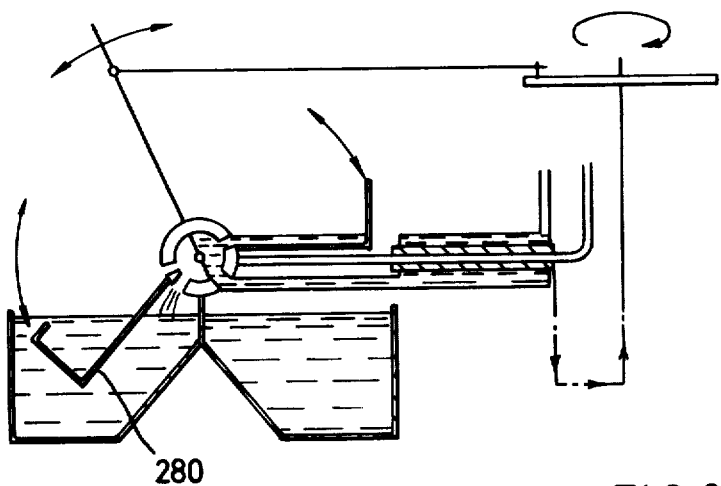
FIG. 37 is a diagrammatic representation of a rocking scoop/water drive thermal system.

FIG. 37 shows another embodiment of a thermal system which employs rocking scoops 280 and a rotary drive arrangement. The rocking action can be used to provide an alternate heating and cooling phase to accept that rotary SME engine in the manner shown diagrammatically in FIG. 37 and the scoops can be activated by a drive from the SME engine. When used in conjunction with a tubular SME element engine this type of system ensures positive separation of the heating and cooling fluids.

Figure 38:
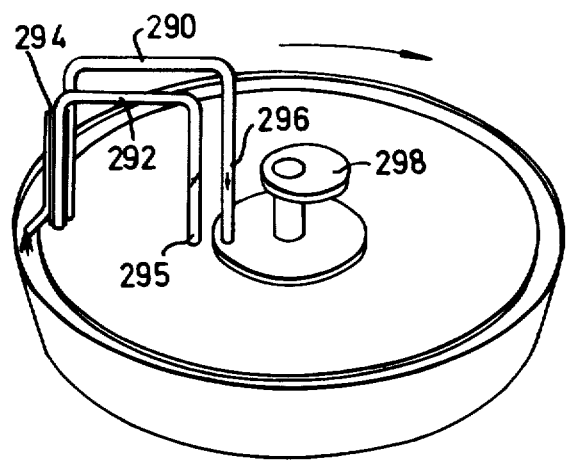
FIG. 38 is a diagrammatic representation of a centrifugally operated thermal system.

FIG. 38 is a diagrammatic representation of a system which uses a centrifugally induced flow along radially disposed ducts 290, 292 to pump heating and cooling fluids to the SME elements 294. In this system the hot and cold flows would be sequenced alternately be means of distribution valves 295, 296 activated by a suitable cam mechanism generally designated 298. In the system shown in FIG. 38 the heating and cooling systems could be arranged to be stored in horizontally disposed tanks with immersion of the moving intake pipe for both the hot and cold liquids although the outlet pipes need not be immersed.

Figure 39:
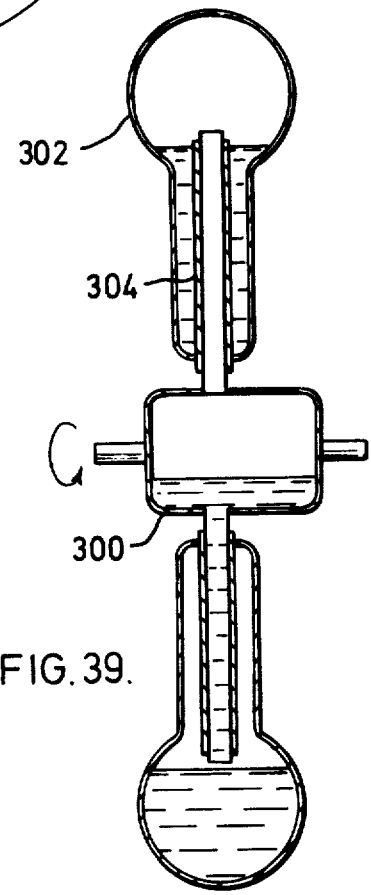
FIG. 39 is a diagrammatic representation of a radially disposed tank thermal system.

With those types of engines that use a horizontal axis it is often possible to arrange tanks of heating and cooling fluid at opposite ends of radially disposed SME elements. Rotating the engines then produces alternate heating and cooling of the SME elements under the action of gravity. In about the simplest form of this system as shown in FIG. 39 the tanks or reservoirs 300, 302 would be filled initially with fixed quantities of heating and cooling fluids and the engine would continue to function until the temperature fluctuations in the element had decreased below some critical value.

Figures 40, 41:
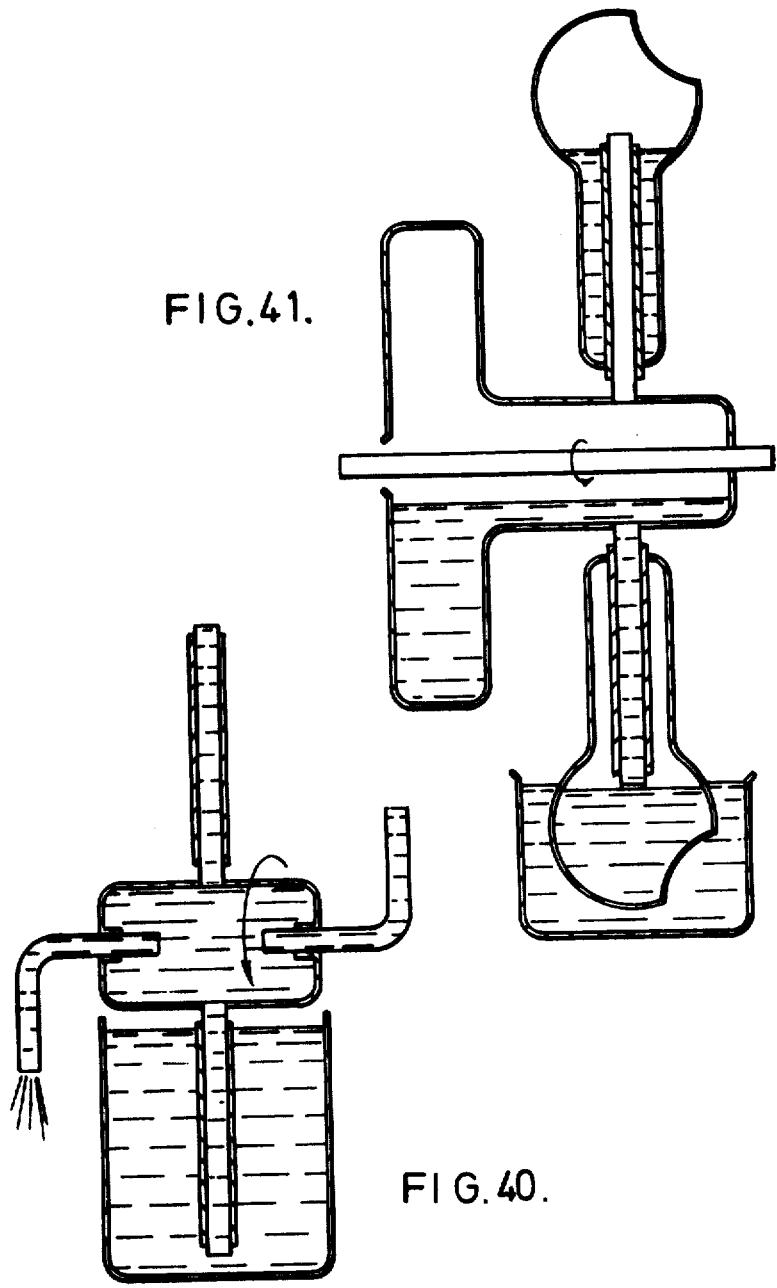
FIG. 40 is a diagrammatic representation of a radially disposed tank thermal system.
FIG. 41 is a diagrammatic representation of a radially disposed tank thermal system with reflash facilities.

FIGS. 40 and 41 illustrates modifications of such radially disposed tank systems which enable continuous recycling of the heating and cooling fluids to be effected.

I claim:

1. A device for converting heat energy into mechanical energy comprising;

a first member and a second member, said first member comprising a plurality of thermally responsive elements arranged about an axis for relative rotation between the first and second members;
means rigidly mounting one end of each said elements in spaced relation about said axis;
means rotatably mounting the other end of each element;
means connected to said elements for mechanically deforming said elements in torsion;
thermal cycling means subjecting said elements to a thermal heating and cooling cycle for generating a cyclic torsional force in said elements in a predetermined phase relationship with the torsional deformation of said mechanical deformation means; and
means connected to said other end of each said elements for converting the torsional forces in said elements to a continuous rotational output torque for rotating said first and second members relatively of each other.

2. A device as claimed in claim 1 wherein said first member is fabricated from an alloy consisting of 63.75% copper, 34.5% zinc and 1.75% silicone.

3. A device as claimed in claim 1 wherein said first member is fabricated from a material consisting of 55.4% nickel and 44.6% titatium.

4. A device as claimed in claim 1 wherein said first member is fabricated from a material consisting of 69.6% copper, 26.2% zinc and 4.2% aluminium.

5. A device as claimed in claim 1 wherein said first member is fabricated from a material consisting of 70.1% copper, 25.9% zinc and 4.0% aluminium.

6. A device as claimed in claim 1 wherein said first member is fabricated from a material consisting of 84.0% copper, 13.3% aluminium and 2.7% nickel.

7. A device as claimed in claim 1 wherein said first member is fabricated from a material consisting of 84.5% copper, 11.25% aluminium and 4.25% manganese.

8. A device as claimed in claim 1 wherein over one part of the cycle said first member has heat energy supplied thereto and over another part of the cycle said first member is cooled.

9. A device as claimed in claim 8 wherein said heat energy is supplied in the form of solar heating.

10. A device as claimed in claim 8 wherein said heat energy is supplied in the form of gas heating.

11. A device as claimed in claim 8 wherein said heat energy is supplied in the form of electric heating.

12. A device as claimed in claim 8, wherein over the said one part of the cycle said first member is exposed to a hot fluid and over another part of the cycle said first member is cooled by exposing it to a cold fluid.

13. The device according to claim 1, wherein said elements are fabricated from a material selected from the group comprising shape memory effect material, bi-metallic material and material having a high coefficient of thermal expansion.

14. The device according to claim 1, wherein said elements of said first member are arranged in spaced, parallel relation about said axis is form or rotor, said means rigidly mounting the one end of each element comprising a first end plate of said rotor and said means rotatably mounting the other free end of each element comprising a second end plate of said rotor, said second end plate having bearings in which the free ends of said elements are mounted.

15. The device according to claim 1, wherein said mechanical deformation means includes a cam eccentrically mounted relative to said axis and a cam follower mounted to the free end of each element whereby rotation of said first member relative to said second member induces torsion in each element which progressively increases to a maximum and then decreases to a minimum during one revolution of said first member relative to said second member.

16. The device according to claim 1, wherein said elements are formed as tubes.

17. The device according to claim 1, wherein said elements are formed as strips.

18. The device according to claim 1, wherein said mechanical deformation means induces torsion in each element which progressively increases to a maximum and then decreases to a minimum during one revolution of said first member relative to said second member, said thermal cycling means subjecting a respective element to heat over that portion of said one revolution where the mechanically induced torsion has reached the maximum and is decreasing to the minimum and subjecting said respective element to cooling over the remaining portion of said one revolution.

19. The device according to claim 1, wherein said elements emanate radially about said axis in a spoke-line manner.

20. The device according to claim 1, wherein said thermally responsive elements comprise tubes having interior and exterior surfaces, said thermal cycling means including first means for circulating a hot fluid over one of said exterior and interior surfaces during a first portion of said cycle and second means for circulating a cold fluid over the other of said exterior and interior surfaces during a second portion of said cycle.

21. The device according to claim 20, wherein said first circulating means comprises a tubular member surrounding each of said tubes in spaced relationship therefrom, said tubular member containing a quantity of hot fluid and means on the interior of said tubular member for flowing said hot fluid over the exterior of its associated tube.

22. The device according to claim 20, wherein said second circulating means includes a cold fluid reservoir in flow communication with the interior surfaces of said tubes.

* * * * *